INVENTORS
HAROLD V. HANSEN
CHARLES H. YOUNGBERG
BY GEORGE F. OELSCHLAEGER

*John C. Thompson*
ATTORNEY

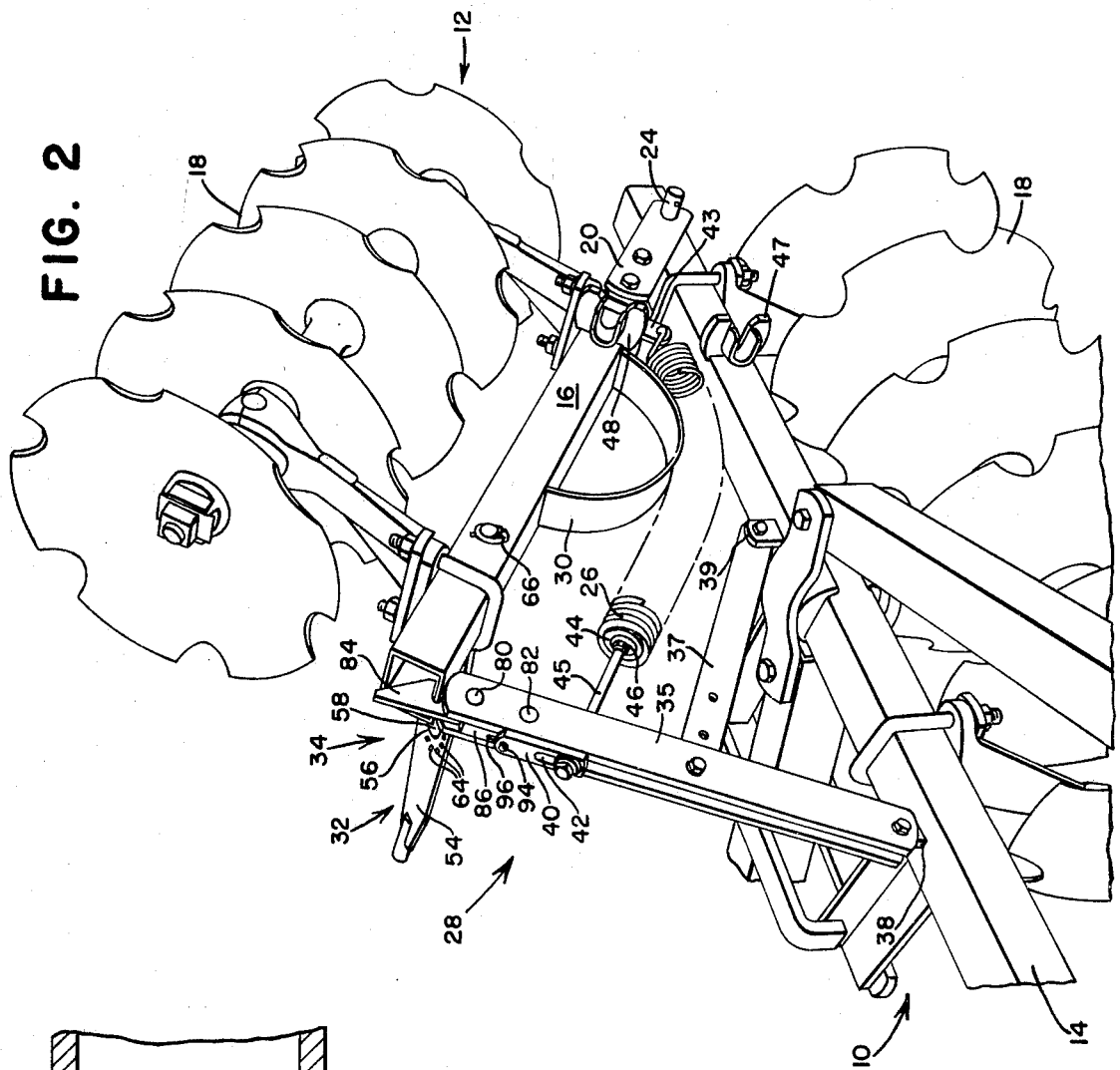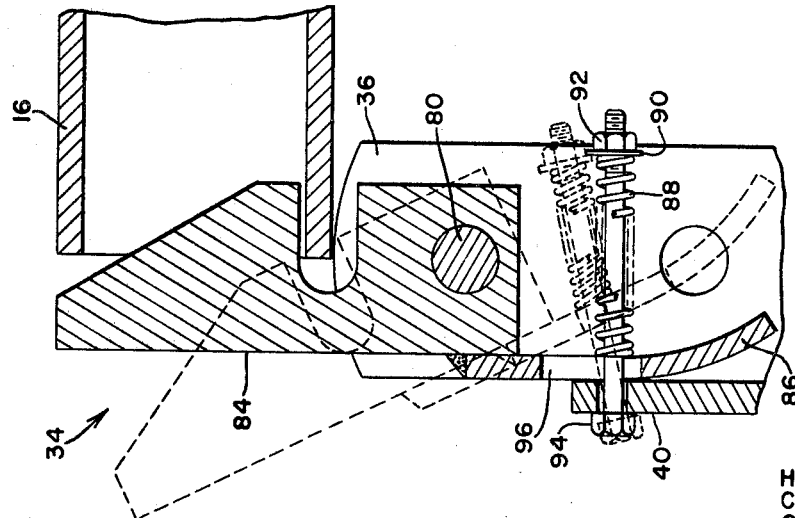

United States Patent Office 3,511,319
Patented May 12, 1970

---

3,511,319
LIFT ASSIST MECHANISM
Harold Valentine Hansen, Cordova, Charles Harold Youngberg, Moline, and George Frederick Oelschlaeger, Rock Island, Ill., assignors to Deere & Company, Moline, Ill., a corporation of Delaware
Filed Jan. 2, 1968, Ser. No. 695,181
Int. Cl. A01b 23/00, 35/28
U.S. Cl. 172—662
7 Claims

ABSTRACT OF THE DISCLOSURE

A mechanism to assist in moping outrigger frames between their extended working position and their folded inoperative position utilizing a spring mounted between the main frame of the implement and the outrigger frame such that when the outrigger frame is in its working position the spring is in tension and urges the outrigger frame toward its inoperative position, and when the outrigger is in its inoperative position, a member rigidly mounted on the outrigger frame displaces the center portion of the spring laterally, causing the spring to then urge the outrigger frame toward its working position.

BACKGROUND OF THE INVENTION

The present invention relates generally to agricultural implements and more particularly to a mechanism for assisting in raising and lowering outrigger frames pivotally mounted on an implement carrier.

Outrigger frame sections are commonly employed on a large variety of agricultural implements. These outrigger frames are generally pivotally mounted such that they may be raised from a lowered extended or working position to a raised inoperative or transport position. As a result, the implement can have a maximum working width, yet still be narrow enough for transport through narrow gates and along narrow roadways. In ground-working agricultural implements, such as disk harrows, the outriggers may also be folded to increase the penetration of the ground-working tools carried by the main frame. On certain implements the outrigger frame sections are so heavy that some type of lift assist mechanism must be employed to aid the manual operation of raising and lowering them. Although certain devices of this type have been used, they are characterized by a relatively complex structure which greatly increases the cost of the implement.

SUMMARY OF THE INVENTION

The basic components of the present lift assist mechanism are an elongated spring, an upwardly extending support arm on the implement main frame, and an upwardly extending member on the outrigger frame. The outer end of the elongated spring is attached to the outrigger frame outwardly from the pivotal connection of the outrigger with the implement main frame, and the inner end of the spring is attached to an upwardly extending arm rigidly mounted on the main frame inwardly from the same pivotal connection. When the outrigger frame is in its working position the spring is in tension and slopes upwardly from its connection with the outrigger frame to its elevated connection with the main frame arm, such that the outrigger is urged toward its folded position. A locking bar serves to rigidly hold the outrigger frame in its lowered working position. An upwardly extending member is rigidly mounted on the outrigger frame outwardly from the connection of the outer end of the spring with the outrigger, in such a manner that when the outrigger is moved to its folded position the member displaces the center portion of the spring. This lateral displacement of the spring causes it to urge the outrigger frame back toward its working position. The upwardly extending arm to which the inner end of the spring is attached serves as a stop for the outrigger frame in its folded position, and a latch mechanism for releasably holding the outrigger in its folded position is mounted on the upper end of the same arm.

The principal object of the present invention, therefore, is to produce a device for assisting in raising and lowering outrigger frames pivotally mounted on an implement carrier. It is another object to provide such a device which is simple in construction and thus easy and inexpensive to manufacture.

BRIEF DESCRIPTION OF THE DRAWINGS

The preferred embodiment of the present invention will be described in conjunction with the accompanying drawings in which:

FIG. 2 is a partial perspective view of the disk harrow with the outrigger frame shown in its raised position.

FIG. 3 is a sectional view illustrating the spring-loaded latch mechanism for holding the outrigger frame in its raised position.

DESCRIPTION OF THE PREFERRED EMBODIMENT

Figure 1:
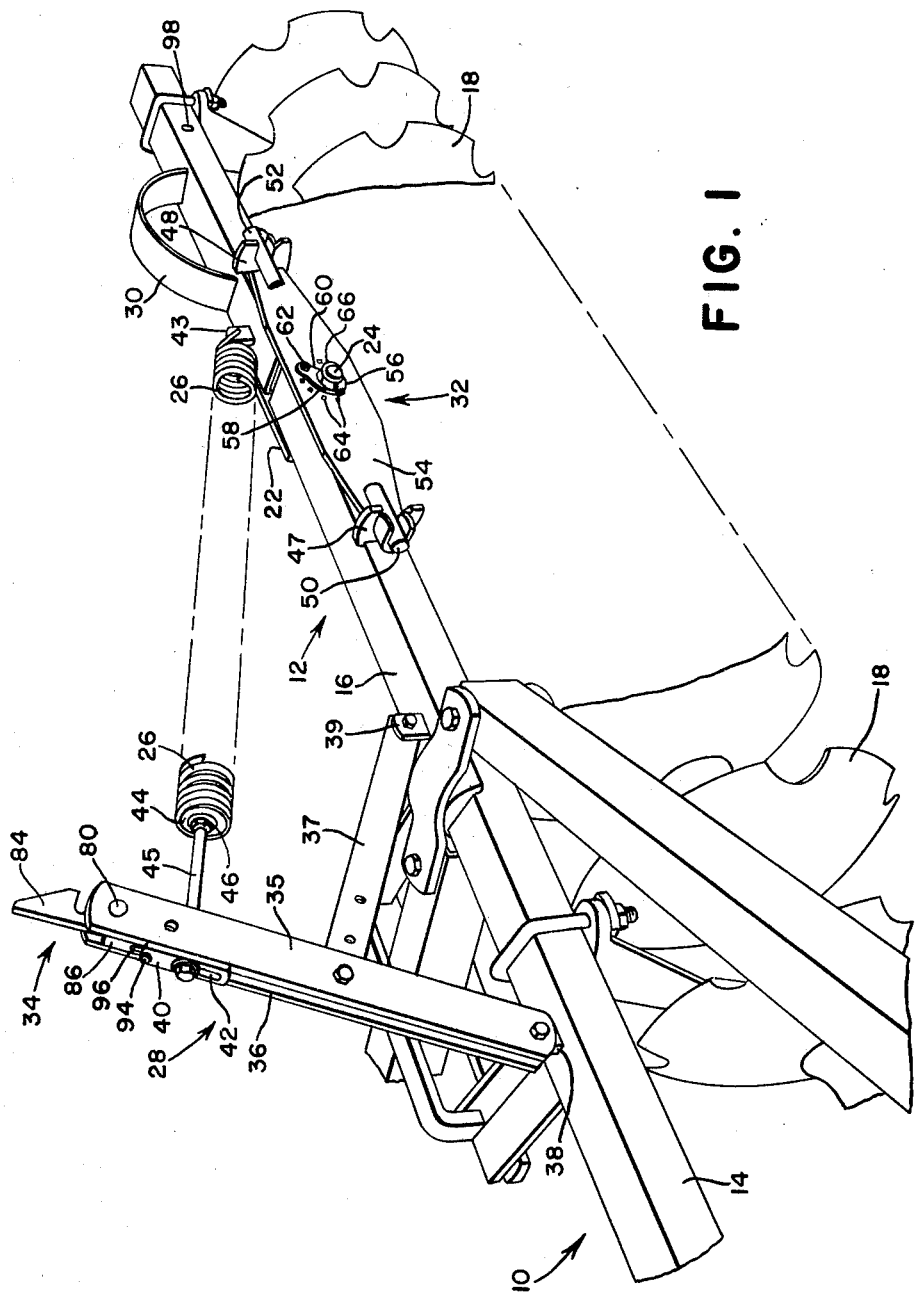
FIG. 1 is a partial perspective view of a disk harrow incorporating the features of the present invention, with the outrigger frame shown in its lowered position.

This invention is shown in conjunction with a disk harrow having a main frame 10 and a plurality of outrigger frames 12 (only one being shown in the drawings). These frames have frame members 14 and 16, respectively, which support disk gangs 18 in a conventional manner. The outrigger frame member 16 has fore-and-aft flanges 20 and 22, respectively, mounted on its inner end portion. The flanges 20 and 22 are suitably apertured to receive pivot pin 24 rigidly mounted on the outer end of main frame member 14, such that the outrigger frame 12 is mounted for pivotal movement between a lowered working position (FIG. 1) and a raised or folded position (FIG. 2.).

The lift assist mechanism comprises, generally, an elongated spring 26, an upwardly extending support arm 28 mounted on the main frame member 14, and an upwardly extending bail 30 mounted on the top side of the outrigger frame member 16. A locking bar 32, which also serves as a lift arm, is included to rigidly lock the outrigger frame 12 in its lowered working position, while a latch mechanism 34 is mounted on the upper end portion of the upwardly extending support arm 28 for retaining the outrigger frame 12 in its raised or folded position.

Support arm 28 is comprised, generally, of fore-and-aft inner arms 35 and 36, respectively, and brace member 37. Arms 35 and 36 are attached to bracket 38 which is in turn rigidly mounted on the top side of the main frame member 14. The upper end portion of brace member 37 is secured between the center portions of arms 35 and 36, and the lower end of brace 37 is attached to bracket 39, which is in turn rigidly mounted on main frame member 14, outwardly from bracket 38. The inner arms 35 and 36 are connected near their upper end portions with plate 40 having slot 42.

The outer end portion of spring 26 is pivotally mounted in bracket 43 which is in turn rigidly mounted on the top side of the outrigger frame member 16. Spring end member 44, which is received by the inner end portion of spring 26, is threaded to receive bolt 45. Bolt 45 is in turn received by slot 42. As shown in FIG. 1, spring 26 is in tension and slopes upwardly from its pivotal connection with bracket 43 when the outrigger 12 is in its lowered position. The tension in spring 26 may be adjusted by first loosening lock nut 46, turning bolt 45 in spring end member 44 to the desired tension setting, and then retightening lock nut 46 against end member 44.

Frame members 14 and 16 each have a U-shaped bracket 47 and 48, respectively, rigidly mounted on its forward side for receiving the end portions 50 and 52, respectively, of locking bar 32. The end portions 50 and 52 of locking bar 32 are rigidly connected with support plate 54, which has a suitable aperture 56 in its center portion for receiving circular cam plate 58. Cam plate 58 has an off-center hole for receiving the end portion of pivot pin 24, and a radially extending arm 60 with a suitable aperture in its outer end for receiving bolt 62. A plurality of holes 64 are equally spaced around the upper portion of and at equal radial distances from the outer circumference of aperture 56, also for receiving bolt 62. The cam plate 58 may thus be adjusted to position the outrigger frame 12 in axial alignment with the main frame 10 when the outrigger is locked in its lowered position. A removable retaining pin 66 is received by a suitable aperture in the outer end of pivot pin 24 for holding the locking bar 32 in its locking position.

Latch mechanism 34, illustrated best in FIG. 3, is mounted between the upper end portions of arms 35 and 36 and includes an upper latch member 84 pivotally mounted on pin 80. An apertured stop member 86 is welded to latch 84. The latch is biased by spring 88 to a position where one side of the stop member 86 engages the inner side of the slotted plate 40, shown in full lines in FIG. 3. The spring 88 is held in place by washer 90 and nut 92 on bolt 94. Bolt 94 passes through a hole in the upper end portion of plate 78 and through the slot or aperture 96 in stop member 86. Pin 82 (FIG. 2), which serves to retain the latch mechanism in its latched position, can be removed to enable the mechanism to pivot about pin 80 against the spring 88, as illustrated by the dotted lines in FIG. 3. When the outrigger frame 12 is moved to its raised position, the outer end of the frame member 16 contacts the slanted upper edge of latch member 84, thus forcing the member to pivot about pin 80. As the frame member 16 is advanced to its stop position against the upper ends of arms 68 and 70, the latch member is returned to its original position by spring 88, and pin 82 is then inserted to hold the device in its latched position.

The bail 30 is disposed such that when the outrigger frame 12 is in its folded position, the bail displaces the center portion of spring 26, as shown in FIG. 2. Due to this lateral displacement of spring 26, the outrigger frame 12 is urged toward its lowered position when it is in its raised position.

To aid in moving the outrigger frame between its folded and working positions, locking bar 32 may be inserted in aperture 98 in the outer end of outrigger frame member 16 as shown in FIG. 2 and used as a lifting arm. The locking bar is secured in this position with retaining pin 66.

To raise the outrigger frame from its working position retaining pin 66 must first be removed from pivot pin 24, which enables locking bar 32 to be removed from its locking position. Locking bar 32 may then be inserted in the outer end portion of the outrigger frame member 16 and used to lift the outrigger with the aid of spring 26. To enable latch member 84 to pivot about pin 80 and thus engage frame member 16, pin 82 must be removed from the support arm 28. The pin 82 may then be replaced after the outer end portion of the frame member 16 is against the upper ends of the arms 68 and 70 and is engaged by the latch member 84.

To lower the outrigger frame from its folded position, the above steps are essentially reversed. Pin 82 must first be removed from the support arm 28. The latch member 84 can then be pivoted about pin 80 to release the outrigger frame 12 and enable it to be swung to its working position with the aid of spring 26. The locking bar 32, which may again be used as a lift arm, is then removed from the outer end portion of the frame member 16, inserted in its locking position, and secured with retaining pin 66.

While the preferred embodiment of the present invention has been shown and described above, it is to be understood that the invention is not to be limited to the particular details of the structure shown and described, but that, in fact, widely different means may be employed without departing from the broader aspects of the invention as defined by the appended claims.

We claim:

1. In combination with an implement carrier having a main frame and outrigger frame means pivotally mounted on said main frame for movement between folded and working positions, a lift assist mechanism comprising: elongated resilient means, said resilient means having a center portion and first and second end portions, said first end portion being pivotally mounted on said outrigger frame means adjacent the pivotal connection between said outrigger frame and said main frame, said second end portion being mounted higher than said first end portion on said main frame inwardly from the pivotal connection between said outrigger frame and said main frame such that said resilient means extends upwardly and inwardly from said first end portion to said second end portion when said outrigger frame is in its working position, said resilient means thus urging said outrigger frame toward its folded position; means to rigidly hold said outrigger frame in its lowered working position against the urging of said resilient means; displacement means, said displacement means comprising an upwardly projecting member rigidly mounted on said outrigger frame outwardly from and in line with said elongated resilient means, said member being mounted such that the center portion of said resilient means is displaced by said member downwardly when said outrigger frame is in its folded position, said resilient means thus urging said outrigger frame toward its working position when said outrigger frame is in its folded position; and a latching mechanism, said latching mechanism mounted on said main frame and adapted to releasably hold said outrigger frame in its folded position against the urging of said resilient means.

2. The invention described in claim 1 in which the second end portion of said resilient means is pivotally mounted on the upper end portion of an upwardly extending arm, said arm being rigidly mounted on said main frame, the upper end of said arm acting as a stop for said outrigger frame in its folded position, and said latching mechanism for holding said outrigger frame in its folded position being mounted on the upper end portion of said arm.

3. A disk harrow comprising: main frame means, outrigger frame means, pivot means securing the outrigger frame means to the main frame means for swinging movement of the outrigger frame means between an extended position and a folded position, lift assist means to assist in swinging the outrigger frame means from its extended position to its folded position and also to assist in swinging the outrigger frame means from its folded position to its extended position, said lift assist means including elongated spring means having center and end portions, means operable to secure one end portion to one of said frame means adjacent said pivot means, an upwardly extending member on the other of said frame members to which the other end of said spring is secured, and an upwardly projecting displacement member secured to said one frame means and operable to displace the spring means in a direction perpendicular to a line between the two end portions when the outrigger frame means is in its folded position, said spring means thus urging the outrigger frame means towards its extended position.

4. The disk harrow set forth in claim 3 in which said upwardly extending member serves as a stop to limit the swinging of the outrigger frame means to its folded position.

5. In combination with an implement carrier having a main frame means and outrigger frame means pivotally mounted on said main frame means for swinging movement between folded and extended positions, a lift assist mechanism to assist in swinging the outrigger frame means from its extended position to its folded position and also to assist in swinging the outrigger frame means from its folded position to its extended position, said lift assist mechanism comprising: elongated resilient means having a center portion and two end portions, one of said end portions being mounted on said main frame means and the other of said end portions being mounted on said outrigger frame means, said resilient means normally urging said outrigger frame means toward its folded position when said outrigger frame means is in its extended position; and displacement means mounted on one of the frame means, engageable with and operable to displace the center portion of said resilient means in a direction perpendicular to a line between the two end portions of said resilient means when said outrigger frame means is in its folded position, said resilient means so displaced thus urging said outrigger frame means toward its extended position when said outrigger frame means is in its folded position.

6. The invention as described in claim 5 in which said elongated resilient means comprises spring means, said spring means including adjustment means to vary the tension of said spring means.

7. The inventon as described in claim 5 in which said displacement means comprises an arcuately-shaped member.

References Cited

UNITED STATES PATENTS

| 768,718 | 8/1904 | Austin | 16—72 |
| 2,218,948 | 10/1940 | Copper | 172—506 X |
| 2,709,274 | 5/1955 | Jorgenson | 16—72 |
| 2,803,034 | 8/1957 | Fleming | 16—180 |
| 2,972,385 | 2/1961 | Walberg | 172—568 |
| 3,067,453 | 12/1962 | Lyons | 16—180 |

FOREIGN PATENTS 557,467  11/1943  Great Britain.

ROBERT E. BAGUILL, Primary Examiner

A. E. KOPECKI, Assistant Examiner

U.S. Cl. X.R.

16—182; 172—572